US005503351A

United States Patent [19]
Vass

[11] Patent Number: 5,503,351
[45] Date of Patent: Apr. 2, 1996

[54] CIRCULAR WING AIRCRAFT

[76] Inventor: Gabor I. Vass, 118-10221 133A Street, Surrey, B.C., Canada, V3T 5J8

[21] Appl. No.: 300,757

[22] Filed: Sep. 6, 1994

[51] Int. Cl.$^6$ .......................... B64C 27/22; B64C 39/06; B64C 29/00
[52] U.S. Cl. ...................... 244/34 A; 244/7 A; 244/12.2; 244/23 C; 244/67; 244/73 C
[58] Field of Search ...................... 244/6, 54, 56, 244/7 A, 7 C, 8, 7 R, 10, 12.2, 17.11, 23 C, 34 A, 67, 73 B, 73 C

[56] References Cited

U.S. PATENT DOCUMENTS

| | | | |
|---|---|---|---|
| 2,008,464 | 7/1935 | Nishi | 244/23 C |
| 2,929,580 | 3/1960 | Ciolkosz | 244/34 A |
| 3,064,929 | 11/1962 | Holland, Jr. | 244/34 A |
| 3,108,764 | 10/1963 | Sudrow | 244/34 A |
| 3,124,323 | 3/1964 | Frost | 244/12.2 |
| 3,129,905 | 4/1964 | Taylor | 244/12.2 |
| 3,405,890 | 10/1968 | Eickmann | 244/7 R |
| 3,486,715 | 12/1969 | Reams . | |
| 3,785,592 | 1/1974 | Kerruish | 244/12.2 |
| 4,598,888 | 7/1986 | Beteille . | |
| 4,979,698 | 12/1990 | Lederman | 244/7 R |
| 5,101,615 | 4/1992 | Fassauer . | |
| 5,163,638 | 11/1992 | Chaneac . | |
| 5,170,963 | 12/1992 | Beck, Jr. | 244/12.2 |
| 5,190,242 | 3/1993 | Nichols | 244/34 A |
| 5,244,167 | 9/1993 | Turk et al. . | |
| 5,255,871 | 10/1993 | Ikeda . | |
| 5,277,380 | 1/1994 | Cycon et al. | 244/12.2 |
| 5,328,131 | 7/1994 | Fodera et al. | 244/73 B |
| 5,351,913 | 10/1994 | Cycon et al. | 244/34 A |

Primary Examiner—Andres Kashnikow
Assistant Examiner—Virna Lissi Mojica
Attorney, Agent, or Firm—Michael I. Kroll

[57] ABSTRACT

A circular wing aircraft in the form of a helicopter comprising a fuselage and a circular wing assembly. A structure is for mounting the circular wing assembly above the fuselage in a stationary manner. An air impeller unit is rotatively carried within the circular wing assembly. A device is for driving the air impeller unit to rotate about a central axis within the circular wing assembly, so as to provide lift and flight movement while yaw control is maintained.

8 Claims, 3 Drawing Sheets

CIRCULAR WING AIRCRAFT

BACKGROUND OF THE INVENTION

The instant invention is the subject matter of Disclosure Document No.: 353726, filed in the PTO on May 10, 1994, and it is respectfully requested that this document be retained beyond the two-year period so that it may be relied upon as evidence of conception of the invention during the prosecution phase of this application, should the need arise.

1. Field of the Invention

The instant invention relates generally to aircraft and more specifically it relates to a circular wing aircraft.

2. Description of the Prior Art

Numerous aircraft have been provided in prior art. For example, U.S. Pat. Nos. 3,486,715 to Reams; 4,598,888 to Beteille; 5,101,615 to Fassauer; 5,163,638 to Chaneac; 5,244,167 to Turk et al. and 5,255,871 to Ikeda all are illustrative of such prior art. While these units may be suitable for the particular purpose to which they address, they would not be as suitable for the purposes of the present invention as heretofore described.

An airborne device known as a helicopter wing device in combination with fixed wing aircraft. The helicopter wing device has a rotor mounted on a vertical shaft that consists of internal parts described in U.S. Pat. No. 3,314,483. The means of handling aboard and in flight down through an extendable launching tube and shielding therefore. Rest lugs are arranged to drop the helicopter wing device to thereby provide flight delivery to the destinations needing service of supply of heavier loads, or those critical such as medical supplies and personnel under direct or remote control devices to suit needs of user.

A fixed-wing aircraft with tandem lifting surfaces has monoplane main wings secured in an intermediate area of the fuselage and a horizontal tail surface with at least one stabilizer plane mounted at the tail of the fuselage. A third supporting surface on the fuselage is in tandem arrangement with the other supporting surfaces. The third supporting surface is a canard surface positioned ahead of the center of gravity of the aircraft.

An air-floated apparatus, such as a lawn mower or vacuum cleaner, is comprised of an endless housing having a bottom opening defined by a relatively flat plate member projecting inwardly from a bottom part of the housing. At least one air impeller is provided for pressurizing air within the housing sufficient to float the housing above a support surface. The plate member directs air laterally into the housing to inhibit the escape of air from the housing and maintain a relatively constant pressure in the housing. In one embodiment, the apparatus is comprised of a lawn mower having a rotatable cutting member mounted within the housing. The rotary action of the cutting member centrifuges grass cuttings within the housing. The plate member acts as a shelf to support the centrifuged grass cuttings and cooperates with an inner wall of the housing, to direct the grass cuttings into a discharge duct for collection in a bag or other receptacle.

An engine and lift unit for rotary wing aircraft together with means for balancing of the rotational torque of the wings is shown. The rotational torque is balanced by a blower propeller, disposed horizontally below the rotor, inside an enclosure including a vertical duct surrounding the blower propeller and whose lower open end exits under the fuselage of the aircraft. A horizontal duct opens into an intermediate zone of the vertical duct and exits out the rear of the aircraft. An adjustable shutter assembly is disposed in the junction of the two ducts allowing the creation of two adjustable air flows, one directed vertically downwards and the other directed towards the rear of the aircraft. The aircraft also has fixed wings, flaps, rudders and controls so the pilot can operate the aircraft in flight.

A lift augmentation system for aircraft which comprises a plurality of propellers parallel to an aircraft wing and inset parallel to and at the trailing edge of the wing. The propellers function to both directly produce vertical lift in the manner of helicopter blades and to augment air circulation over the wing to enhance lift produced by the wing. The propellers are set into the trailing edge of the wing along the length of the wing, with the inboard propellers preferably closely spaced to the fuselage to force air flow over the reducing taper of the fuselage. Each propeller is tiltable in all directions about the vertical axis through the propeller hub and the assembly of engine and propeller is hinged to the wing for pivoting in a plane substantially parallel to the aircraft axis.

A helicopter comprises a pair of rotors, each having a flap hinged to one of its edges. A seesaw rod is swingably supported above the rotors. A pair of auxiliary wings are fixed to opposite ends of the seesaw rod. A pair of connecting rods each connect one of the flaps with the seesaw rod above it. When the lift produced by one of the rotors becomes larger than that produced by the other, the auxiliary wing located above the rotor producing the larger lift rises and turns up the flap of the rotor to reduce its flap effect and decrease the rotor lift. The auxiliary wing located above the rotor producing the smaller lift lowers and turns down the flap of the rotor, to increase its flap effect and raise its lift. As a result, the lifts of the two rotors are regulated.

SUMMARY OF THE INVENTION

A primary object of the present invention is to provide a circular wing aircraft that will overcome the shortcomings of the prior art devices.

Another object is to provide a circular wing aircraft that utilizes fewer components than currently produced aircraft, thereby less maintenance requirements are needed.

An additional object is to provide a circular wing aircraft, in which in an autogiro form a smaller wingspan is required for similar aircraft weight and in a helicopter form the tail and tail rotor are eliminated, since the circular wing assembly maintains yaw control.

A further object is to provide a circular wing aircraft that is simple and easy to use.

A still further object is to provide a circular wing aircraft that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
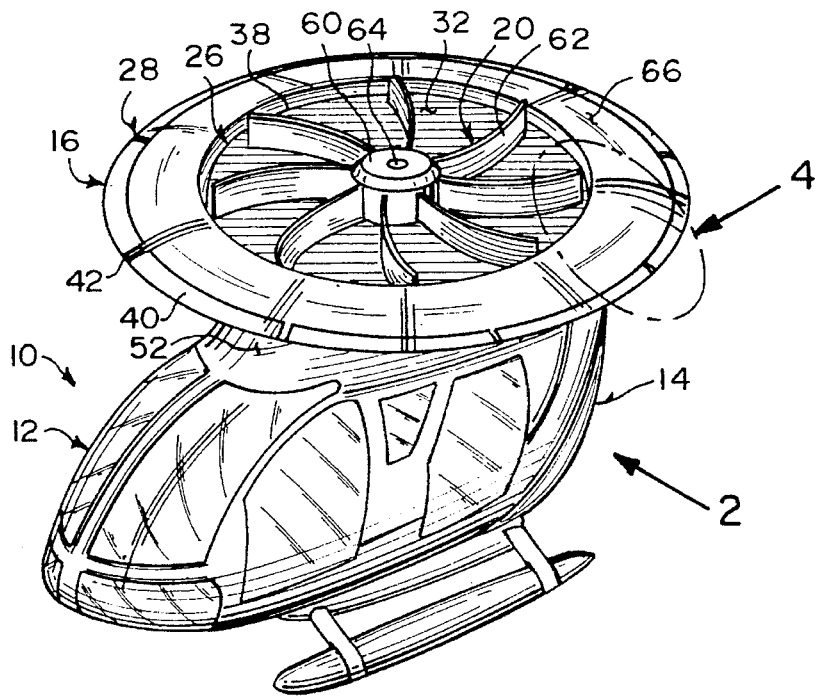
FIG. 1 is a perspective view of the instant invention incorporated into a helicopter.
Figure 2:
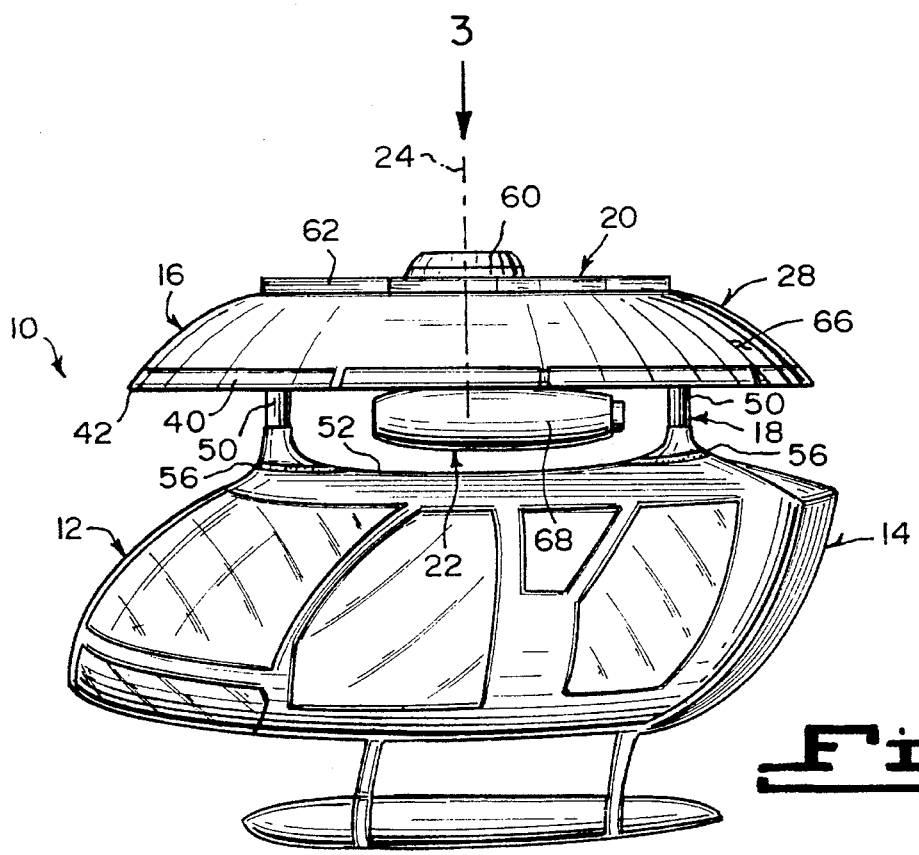
FIG. 2 is a side elevational view taken in the direction of arrow 2 in FIG. 1.
Figure 3:
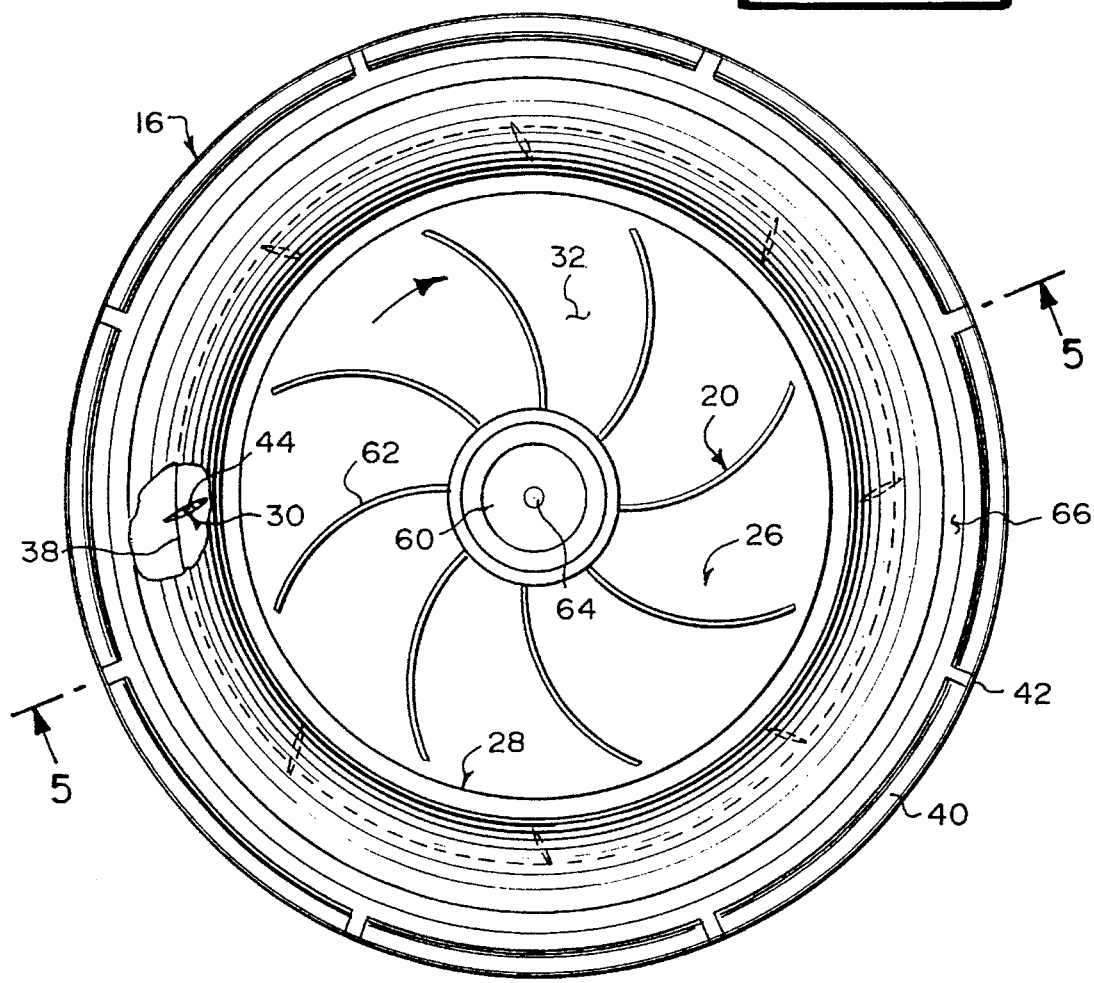
FIG. 3 is a top view of the circular wing assembly per se taken in the direction of arrow 3 in FIG. 2.

Turning now descriptively to the drawings, in which similar reference characters denote similar elements throughout the several views, FIGS. 1 and 2 illustrate a circular wing aircraft 10 in the form of a helicopter 12, comprising a fuselage 14 and a circular wing assembly 16. A structure 18 is for mounting the circular wing assembly 16 above the fuselage 14 in a stationary manner. An air impeller unit 20 is rotatively carried within the circular wing assembly 16. A device 22 is for driving the air impeller unit 20 to rotate about a central axis 24 within the circular wing assembly 16, so as to provide lift and flight movement while yaw control is maintained.

The circular wing assembly 16, as best seen in FIGS. 3 through 6, consists of a lower disc wing 26 and an upper ring wing 28. A plurality of wing mounts 30, are radially spaced apart about the central axis 24 and affixed between a top surface 32 of the lower disc wing 26 and a bottom surface 34 of the upper ring wing 28.

The upper ring wing 28 is airfoil-shaped 36 in a cross section and is sized to overlap the perimeter 38 of the lower disc wing 26. The upper ring wing 28 contains a plurality of sectional flaps 40 that are independently controllable about the outer circumference 42, for better lift and maneuverability. Each wing mount 30 is airfoil-shaped 44 in cross section and includes a movable flap 46 at its outer edge 48, to increase and decrease a twisting force for yaw control.

The mounting structure 18 includes a plurality of suspension members 50 radially spaced apart about the central axis 24. Each suspension member 50 extends between a top surface 52 of the fuselage 14 and a bottom surface 54 of the lower disc wing 26. Each suspension member 50 is independently length adjustable. The circular wing assembly 16 can be tilted in any direction relative to the fuselage 14, thus allowing the fuselage 14 to stay level in horizontal flight. A first rubber shock absorber connector 56 is at the top surface 52 of the fuselage 14. A second rubber shock absorber connector 58 is at the bottom surface 54 of the lower disc wing 26, so that vibration can be reduced, resulting in a low noise level in the fuselage 14.

The air impeller unit 20 contains a hub 60, with a plurality of curved blades 62 extending radially from the hub 60. A drive shaft 64 extends from the hub 60 through the central axis 24 to the driving device 22. The curved blades 62 can rotate with the hub 60 on the drive shaft 64, to draw air from the top and blow the air out at a high velocity in radial directions over the top surface 32 of the lower disc wing 26. This creates a low pressure zone on the top surface 32 with static air pressure beneath the lower disc wing 26, providing a lifting force perpendicular to the bottom surface 54 of the lower disc wing 26. The air is also blown above a top surface 66 and below the bottom surface 34 of the upper ring wing 28, respectively creating an additional lift.

Figure 4:
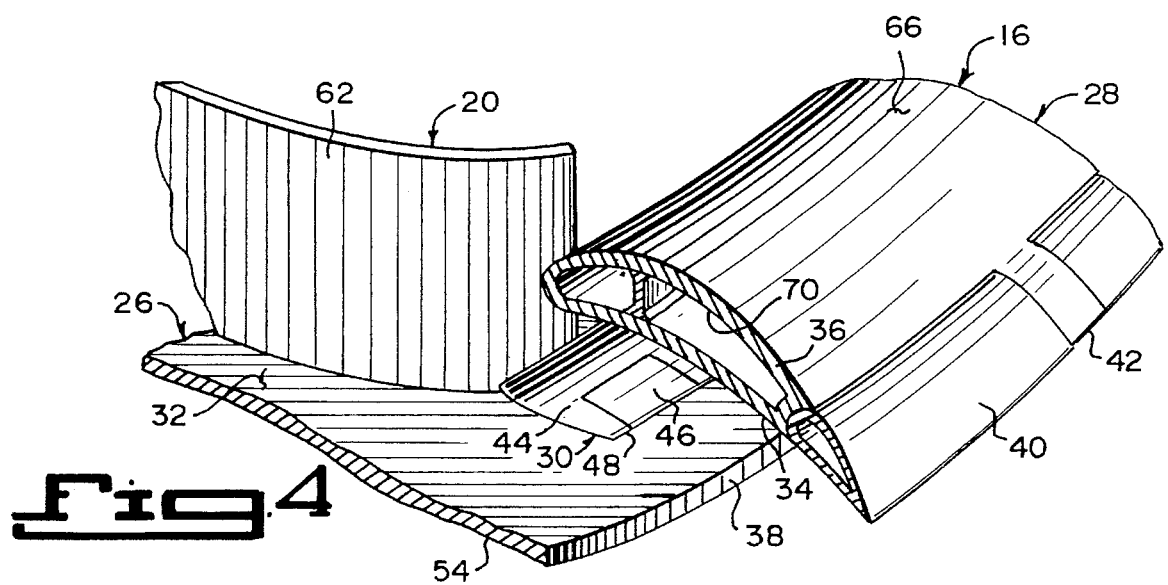
FIG. 4 is an enlarged perspective view of a portion of the circular wing assembly as indicated by arrow 4 in FIG. 1.
Figure 5:
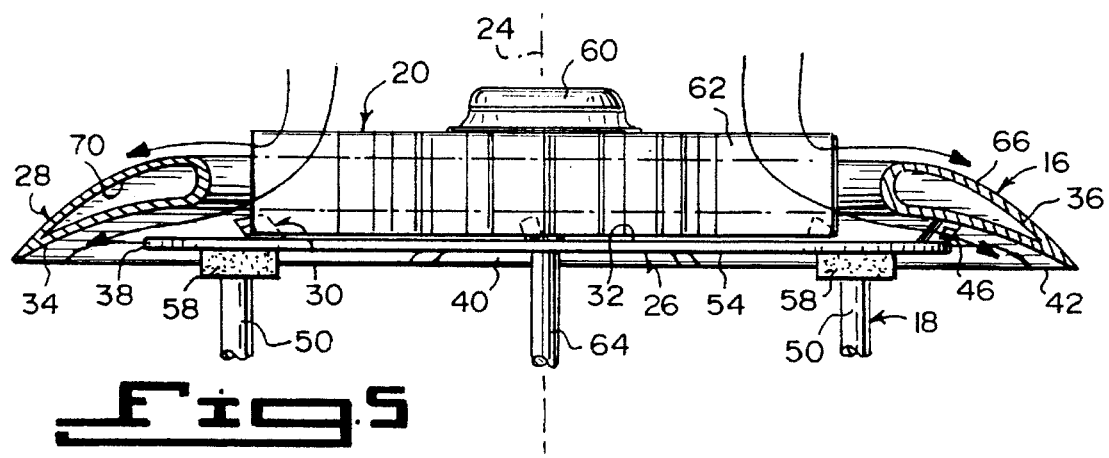
FIG. 5 is a cross sectional view taken along line 5—5 in FIG. 3.

The driving device 22 is an engine 68 directly connected to the circular wing assembly 16 and coupled to the drive shaft 64. The upper ring wing 28 can be hollow, as shown in FIGS. 4 and 5, having an annular chamber 70 therein to be used as a fuel tank, thereby allowing maximum space within the fuselage 14 for a payload.

Figure 7:
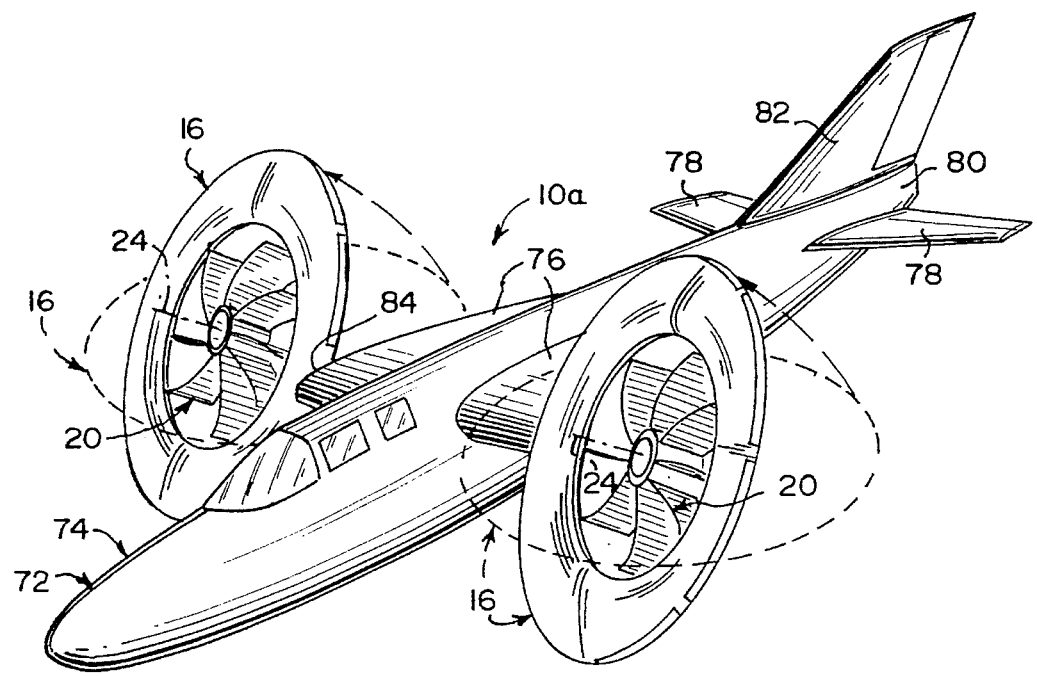
FIG. 7 is a perspective view of the instant invention incorporated into an autogiro.
Figure 6:
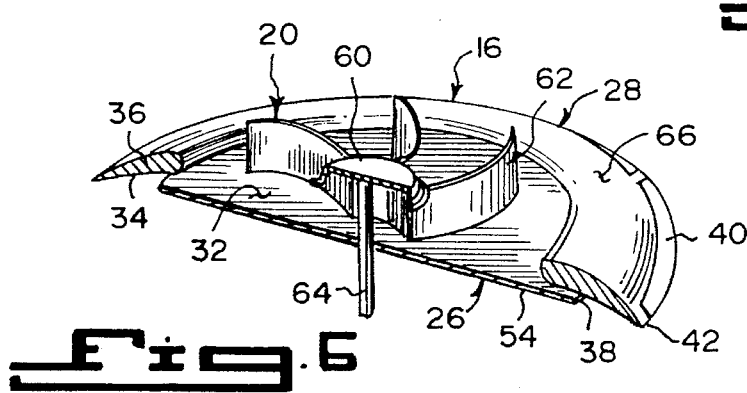
FIG. 6 is a cross sectional perspective view of a modified circular wing assembly.

FIG. 7 shows a circular wing aircraft 10a in the form of an autogiro 72, comprising a fuselage 74. A pair of short fixed wings 76, each extend outwardly from an opposite side at the middle of the fuselage 74. A pair of stabilizers 78, each extend outwardly from an opposite side at the tail 80 of the fuselage 74. A rudder 82 extends upwardly from the tail 80 of the fuselage 74. A pair of circular wing assemblies 16, are each pivotally mounted and controlled on a distal free end 84 of one short fixed wing 76. A pair of air impeller units 20, are each rotatively driven within one circular wing assembly 16, to rotate about a central axis 24 by an engine (not shown), so as to provide lift and flight movement while yaw control is maintained.

| LIST OF REFERENCE NUMBERS | |
| --- | --- |
| 10 | circular wing aircraft |
| 10a | circular wing aircraft |
| 12 | helicopter for 10 |
| 14 | fuselage of 12 |
| 16 | circular wing assembly |
| 18 | mounting structure |
| 20 | air impeller unit |
| 22 | driving device |
| 24 | central axis |
| 26 | lower disc wing |
| 28 | upper ring wing |
| 30 | wing mount |
| 32 | top surface of 26 |
| 34 | bottom surface of 28 |
| 36 | air foil-shaped cross section of 28 |
| 38 | perimeter of 26 |
| 40 | sectional flap in 28 |
| 42 | outer circumference of 28 |
| 44 | air foil-shaped cross section of 30 |
| 46 | movable flap in 30 |
| 48 | outer edge of 30 |
| 50 | suspension member of 18 |
| 52 | top surface of 14 |
| 54 | bottom surface of 26 |
| 56 | first rubber shock absorber connector at 52 |
| 58 | second rubber shock absorber connector at 54 |
| 60 | hub of 20 |
| 62 | curved blade on 60 |
| 64 | drive shaft on 60 |
| 66 | top surface of 28 |
| 68 | engine for 22 |
| 70 | annular chamber in 28 |
| 72 | autogiro for 10a |
| 74 | fuselage of 72 |
| 76 | short fixed wing |
| 78 | stabilizer on 80 |
| 80 | tail of 74 |
| 82 | rudder on 80 |
| 84 | distal free end of 76 |

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A circular wing aircraft in the form of a helicopter comprising:

a) a fuselage;
 b) a circular wing assembly, said circular wing assembly including a lower disc wing, an upper ring wing, and a plurality of wing mounts radially spaced apart about the central axis and affixed between a top surface of said lower disc wing and a bottom surface of said ring wing, said upper ring wing is airfoil-shaped in cross section and is sized to overlap the perimeter of said lower disc wing;
 c) means for mounting said circular wing assembly above said fuselage;
 d) an air impeller unit rotatively carried within said circular wing assembly; and
 e) means for driving said air impeller unit to rotate about a central axis within said circular wing assembly, so as to provide lift and flight movement while way control is maintained.

2. A circular wing aircraft as recited in claim 1, wherein said upper ring wing includes a plurality of sectional flaps that are independently controllable about the outer circumference for better lift and maneuverability.

3. A circular wing aircraft as recited in claim 2, wherein each said wing mount is airfoil-shaped in cross section and includes a movable flap at its outer edge, to increase and decrease a twisting force for yaw control.

4. A circular wing aircraft as recited in claim 3, wherein said mounting means includes a plurality of suspension members radially spaced apart about the central axis, with each said suspension member extending between a top surface of said fuselage and a bottom surface of said lower disc wing.

5. A circular wing aircraft as recited in claim 4, wherein each said suspension member is independently length adjustable, allowing said circular wing assembly to be tilted in any direction relative to said fuselage, thus allowing said fuselage to stay level in horizontal flight and includes a first rubber shock absorber connector at the top surface of said fuselage and a second rubber shock absorber connector at the bottom surface of said lower disc wing, so that vibration can be reduced, resulting in a low noise level in said fuselage.

6. A circular wing aircraft as recited in claim 5, wherein said air impeller unit includes:

a) a hub;
 b) a plurality of curved blades extending radially from said hub; and
 c) a drive shaft extending from said hub through the central axis to said driving means, so that said curved blades can rotate with said hub on said drive shaft, to draw air from the top, and blow the air out at a high velocity in radial directions over the top surface of said lower disc wing, to create a low pressure zone on the top surface with static air pressure beneath said lower disc wing, providing a lifting force perpendicular to the bottom surface of said lower disc wing, while the air is also blown above a top surface and below the bottom surface of said upper ring wing, respectively creating an additional lift.

7. A circular wing aircraft as recited in claim 6, wherein said driving means is an engine directly connected to said circular wing assembly and coupled to said drive shaft.

8. A circular wing aircraft as recited in claim 7, wherein said upper ring wing is hollow having an annular chamber therein to be used as a fuel tank, thereby allowing maximum space within said fuselage for a payload.

\* \* \* \* \*